United States Patent [19]
Griffin et al.

[11] Patent Number: 5,743,289
[45] Date of Patent: Apr. 28, 1998

[54] DRAIN CHANNEL AND FORMS FOR BACKFLOW PREVENTION DEVICE COVER

[75] Inventors: Herman W. Griffin, Mt. Juliet; Edgar L. Cantrell, Lebanon, both of Tenn.

[73] Assignee: Griffin & Cantrell Co., Inc., Mt. Juliet, Tenn.

[21] Appl. No.: 743,940

[22] Filed: Nov. 5, 1996

[51] Int. Cl.⁶ .................................................. F16K 49/00
[52] U.S. Cl. ........................ 137/341; 137/312; 137/377; 137/382
[58] Field of Search .......................... 137/312, 377, 137/382, 341; 251/299

[56] References Cited

U.S. PATENT DOCUMENTS

| Re. 33,523 | 1/1991 | Devine | 137/341 |
|---|---|---|---|
| 356,448 | 1/1887 | Clark | 251/299 |
| 1,204,464 | 11/1916 | Lofton . | |
| 1,322,014 | 11/1919 | Hanna . | |
| 2,937,009 | 5/1960 | Anderson . | |
| 3,120,600 | 2/1964 | True | 219/38 |
| 3,313,241 | 4/1967 | Newman | 103/221 |
| 3,784,785 | 1/1974 | Noland | 219/301 |
| 3,927,860 | 12/1975 | Smith et al. | 251/299 |
| 4,110,603 | 8/1978 | Peterson | 219/535 |
| 4,259,981 | 4/1981 | Busse | 137/375 |
| 4,278,115 | 7/1981 | Briles et al. | 137/312 |
| 4,520,852 | 6/1985 | Klein | 137/312 |
| 4,556,080 | 12/1985 | Picaud | 137/296 |
| 4,558,206 | 12/1985 | Ball | 219/301 |
| 4,716,926 | 1/1988 | Jacobs | 137/312 |
| 4,726,394 | 2/1988 | Devine | 137/341 |
| 4,798,239 | 1/1989 | Persohn et al. | 165/45 |
| 4,890,638 | 1/1990 | Davenport | 137/382 |
| 4,993,450 | 2/1991 | Dunn | 137/382 |
| 5,078,171 | 1/1992 | Moore et al. | 137/15 |
| 5,150,730 | 9/1992 | Campbell | 137/364 |
| 5,520,207 | 5/1996 | Newsome et al. | 137/15 |

*Primary Examiner*—A. Michael Chambers
*Attorney, Agent, or Firm*—Fish & Richardson, P.C.

[57] ABSTRACT

An apparatus for maintaining the temperature of material contained in fluid conveying devices. The apparatus may include a cover that encloses a fluid conveying device and a drain channel that is supported upon a surface, such as a concrete slab. Heating elements may be included within the drain channel or enclosure to maintain the temperature of the material and the fluid conveying devices surrounding the material above a predetermined setpoint. The drain channel may employ a suitable valve or valves to facilitate the removal of discharged material from the enclosure in applications where the fluid conveying device discharges material to the atmosphere. Adjustable forms are included that support the drain channel and provide the perimeter for a concrete slab.

22 Claims, 8 Drawing Sheets

DRAIN CHANNEL AND FORMS FOR BACKFLOW PREVENTION DEVICE COVER

BACKGROUND OF THE INVENTION

The invention relates in general to an apparatus for protecting fluid conveying devices from freezing. More particularly, the invention relates to a drain channel and valve for facilitating the removal of discharged fluid from an apparatus that protects backflow prevention devices and their associated piping. The invention also relates to structural forms that aide in the construction of the drain channel and concrete supporting slab.

Backflow prevention devices are well known and typically include an assembly of one or more check valves installed in a pipeline. These devices prevent the reverse flow, or backflow, of fluid from the downstream pipeline to the upstream supply pipeline or main, which can result when the fluid pressure in the upstream supply pipeline falls below the fluid pressure in the downstream pipeline. The prevention of backflow is particularly important when the downstream pipeline contains contaminated material and the upstream supply pipeline is carrying potable water.

Backflow prevention devices may or may not discharge fluid to the atmosphere. For example, a double check assembly does not discharge fluid. However, when the prevention of backflow is necessitated by health considerations, such as in an installation where contaminated water could be conveyed back into a potable water main, a reduced pressure zone device is included in the assembly. Reduced pressure zone devices discharge a large volume of water when actuated, and thus the downstream water, which may be contaminated, is transferred out of the downstream pipeline to the atmosphere and not back into the upstream supply pipeline. Besides discharging large volumes, these reduced pressure zone devices intermittently discharge small quantities of water. Since these backflow prevention devices are frequently installed in a water supply line outdoors and above ground, it is important that the devices be enclosed and protected from the weather, and particularly from freezing.

It is well known that water lines need to be protected from freezing. Many pipelines are run underground to avoid exposure to ambient temperatures that are below the freezing point of water. Pipelines are also run underground for aesthetic reasons. While a majority of a pipeline may be underground, backflow prevention devices and their associated valving and piping cannot be buried underground because access is needed for proper operation and maintenance of the backflow prevention device. Additionally, discharging backflow prevention devices must be elevated because they must not be submerged in the discharged material. Therefore reduced pressure zone devices cannot be buried in the ground or installed in a floodable pit for the additional reason that they must not be submerged. Thus, in many installations the pipeline is run underground and the portions of the pipeline having backflow prevention devices are constructed above ground level. The backflow prevention devices, valves, and portions of the pipeline are subject to freezing and may become inoperable unless they are protected from the weather.

Years ago, large concrete or cast iron boxes were constructed around backflow prevention devices. A door was provided in the top of the box to provide access to the interior of the box for servicing the device. Open drain holes were formed in the lower portions of the side or end walls of the box to drain any water discharged by the backflow prevention device away from the box. These boxes are inferior due to the material of construction and because access to the interior of the box was difficult. Moreover, because of the open fixed drain holes in these boxes, water, foreign objects and most importantly cold air would enter the interior portion of the box. The movement of cold air into the box defeated a central purpose of its design by facilitating the freezing of the water within backflow prevention device and its associated piping and valving.

U.S. Pat. No. Re. 33,523, to Devine, discloses another type of apparatus for protecting a backflow prevention device. This apparatus includes a sectionalized cover which is held together by clamps. The top portion of the cover has openings to permit control of the protruding valve stems which extend above the cover. Drain openings are provided at ground level to permit drainage of liquid from the space within the cover. These drain openings are covered by a screen and vertically cut flaps which hang from the top of the opening to ground level. These flaps flex to permit discharged water to flow outwardly. The interior of the cover is insulated and includes an electric heating element. Although there are many drawbacks associated with the Devine cover, an important one is that the openings in the top portion allow air to be transferred to and from the interior of the cover, thus significantly increasing the heating requirements of the enclosure and, in some cases, making freeze protection impractical. Further, the drain openings are not adequately sealed by the flaps and thus are energy inefficient.

Another type of cover is disclosed in U.S. Pat. No. 4,890,638 (the "'638 cover"), which includes a cover member having a top wall and four side or end walls. While the cover discussed in this patent does not contain openings in the top portion as described in the Devine apparatus, the '638 cover does have drain openings at ground level in the bottom edge portion of the side walls to allow water discharged by the backflow prevention device to escape from the interior of the cover. These drain openings are covered by drain flaps, which are of the same rigid construction as the cover walls. These flaps are hingedly attached to the cover and are spring biased to be maintained in a closed position with the bottom of the flap above the top floor surface. This cover reduces some of the flow of cold air to the backflow prevention device, however it suffers from the limitations that air can blow under the flaps and the hinge and spring must be maintained. Furthermore, the drain flap construction is such that a small object can block the entire drain opening.

The foregoing demonstrates that there is a need for an energy-efficient apparatus which protects backflow prevention devices, improves drain valve operation, minimizes the flow of cold air into the apparatus, and provides concrete forms for facilitating the installation of a drain channel.

SUMMARY OF THE INVENTION

The invention satisfies the need and avoids the drawbacks of the prior art by providing an apparatus which efficiently protects a backflow prevention device or any number of fluid conveying or monitoring devices from freezing. The invention provides a drain channel that may be utilized by any style cover, particularly in connection with a cover which does not have discharge openings. Thus fabrication costs can be reduced as a manufacturer may produce simplified covers and provide the drain channel of the invention only in instances where the fluid conveying device is one that discharges fluid.

The valves of the invention are constructed such that the drain openings are closed when there is no flow of fluid out of the cover and thus the transfer of air into the cover is minimized. Heating elements, which may be powered in any known manner, may be included within the drain channel or enclosure to maintain the temperature of the material and the fluid conveying devices. Additionally, the valves are designed so that a small object cannot block the entire drainage opening.

The invention also provides forms useful for creating a concrete slab to support the cover and drain channel of the invention. The forms are adjustable to allow the fabrication of a plurality of variably sized slabs.

DETAILED DESCRIPTION

Figure 1:
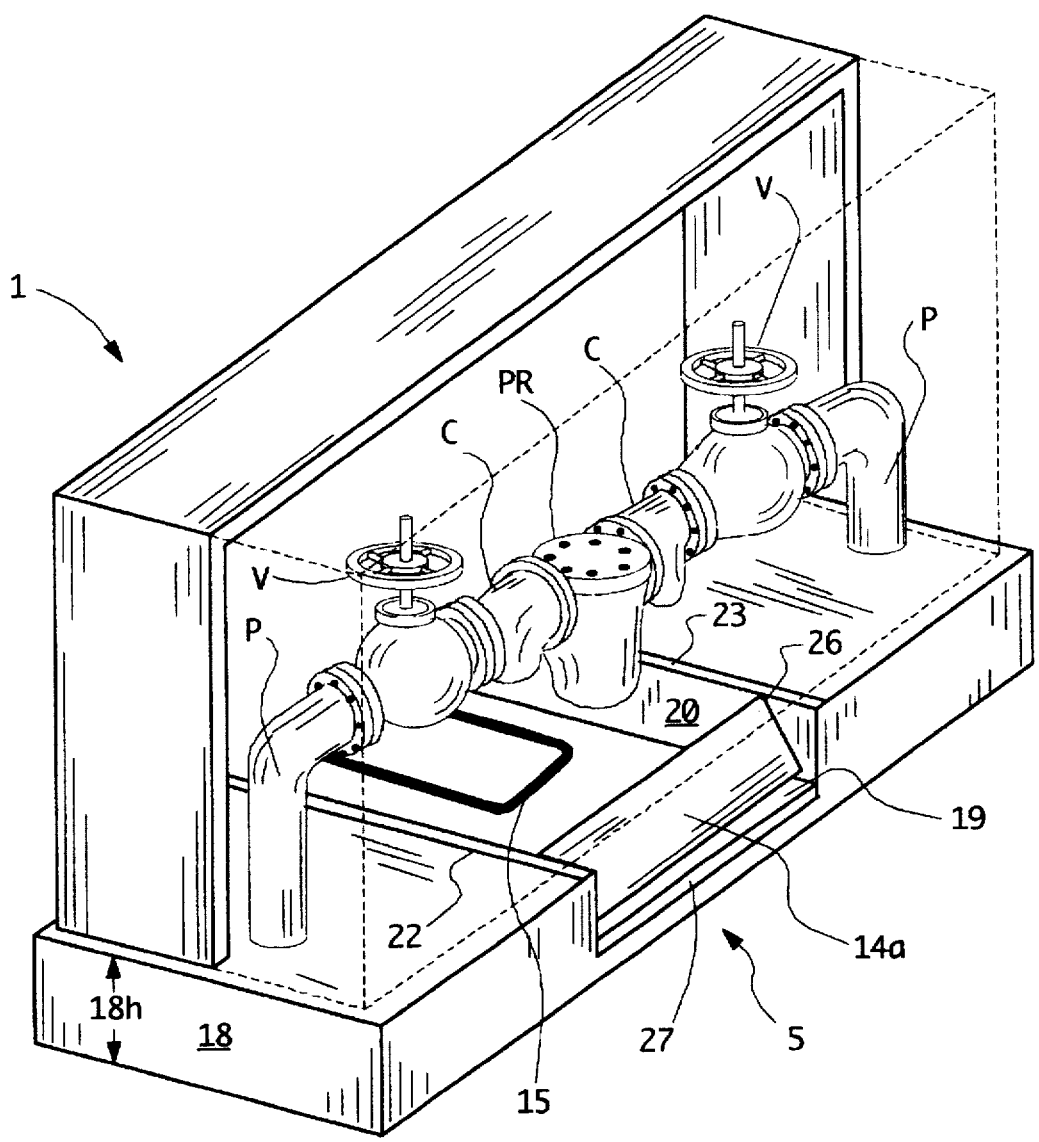
FIG. 1 is a perspective view of a drain channel and cover enclosing a backflow prevention device and its associated valving and upstream and downstream piping.

FIG. 1 illustrates one embodiment of the invention. The cover 1 encloses the backflow prevention device, which is shown in FIG. 1 as two check valves C, a relief valve PR, servicing valves V and piping P. Although the invention is described for use in connection with a backflow prevention device, the enclosure may be employed to maintain the temperature of material being conveyed through any number of fluid conveying or monitoring devices, such as meters, vacuum breakers, standpipes, pressure regulators, and pumps (referred to generally as "fluid conveying devices").

The assembly shown in FIG. 1 constitutes a portion of a substantially longer pipeline wherein a majority of the pipeline is installed underground. The backflow prevention device is constructed above the ground to allow for its monitoring and servicing. Additionally, if the device is one that discharges water, the backflow prevention device must be disposed high enough above ground level to permit the discharge of water to the atmosphere without submerging the backflow prevention device.

Figure 2:
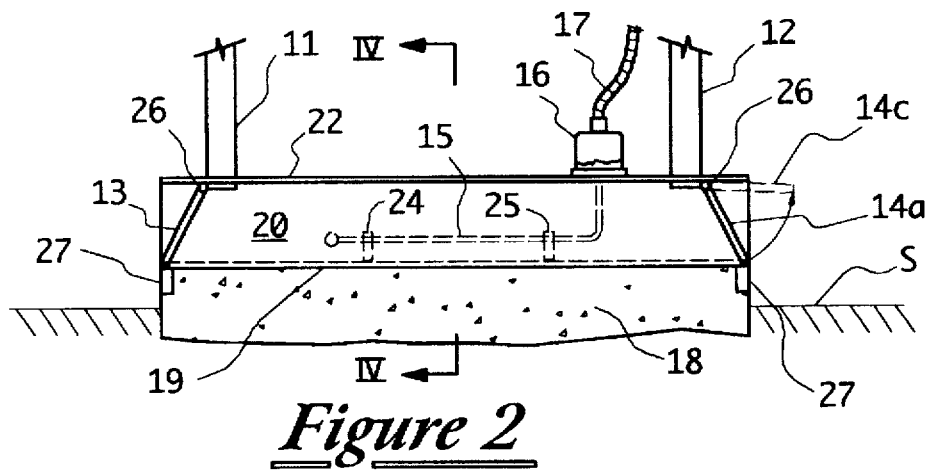
FIG. 2 is a cross-sectional end elevational view of a drain channel and cover constructed according to the principles of the invention with the heater element shown in phantom.

In this embodiment cover 1 is depicted as a rectangular box that may be supported by concrete slab 18. Cover 1 may be bolted to concrete slab 18 or attached in any suitable manner known in the art. As shown in FIG. 2, concrete slab 18 may go below the surface S, which may be the ground, pavement, or the like. Concrete slab 18 also may rest upon the surface S. Slab 18 may be of various sizes depending on the size of the fluid conveying device and the cover 1. While the slab height 18h may be any suitable distance, in one embodiment the slab height 18h may be several feet so that the cover may be protected from various dangers, such as automobiles that may drive into and damage covers (and fluid conveying devices) that are installed adjacent parking lots and roadways. The slab 18 may be pre-fabricated or it may be poured around piping P and on either side of the drain channel 5.

Figure 3A:
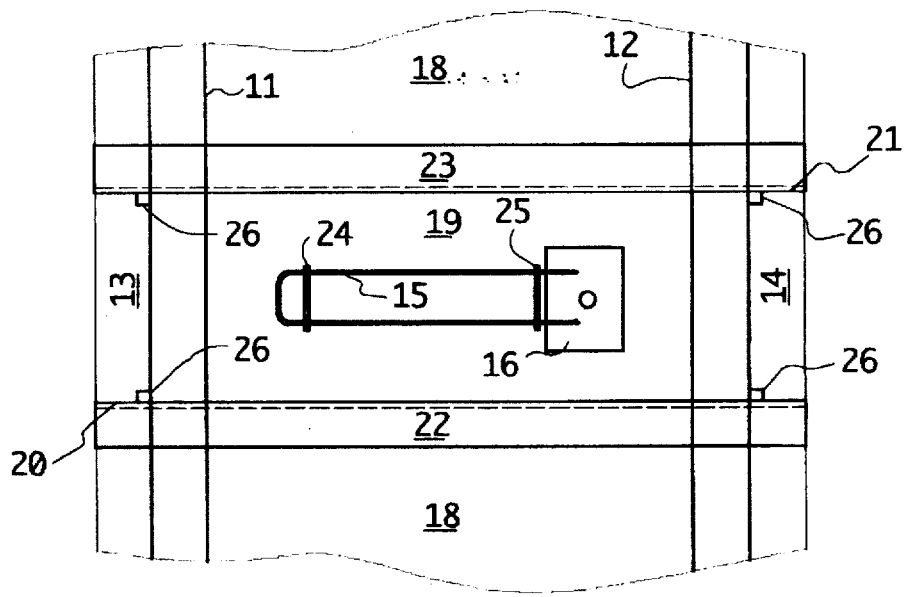
FIG. 3A is an enlarged view of FIG. 3.
Figure 3:
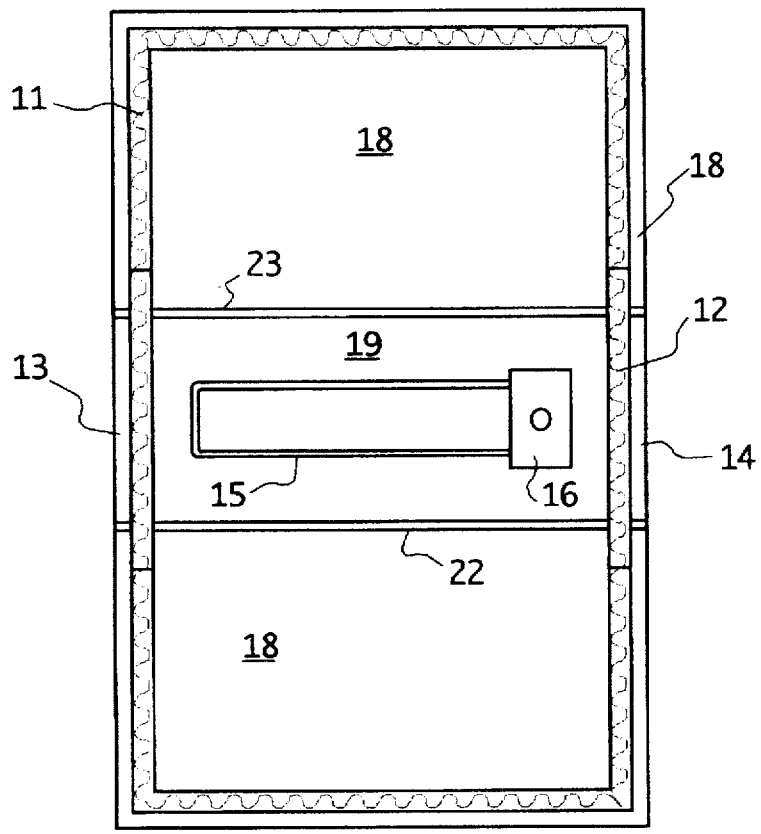
FIG. 3 is a top view of the drain channel and cover taken with the top wall of the cover removed.
Figure 4:
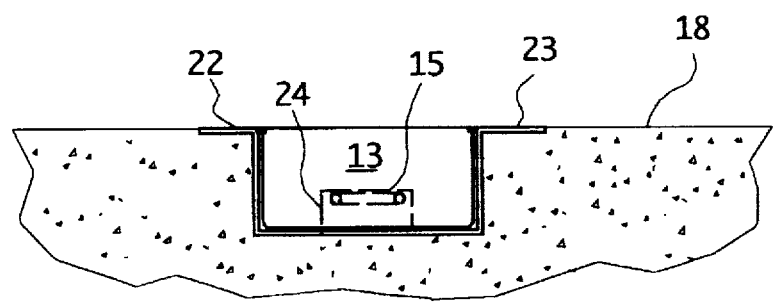
FIG. 4 is an elevational side view of the drain channel taken along line IV—IV of FIG. 2.

According to the principles of the invention, cover 1 may be of any construction. For example, cover 1 may include access doors to allow for service and monitoring of the fluid conveying devices similar to that described in U.S. Pat. Nos. Re. 33,523 and 4,890,638, the disclosures of which are incorporated by reference herein in their entirety. Access doors are shown in FIGS. 2, 3 and 3A. The cover also may be constructed as a single structure where access is achieved by removing the cover in a manner similar to that described in U.S. Pat. No. 4,993,450, the disclosure of which is incorporated by reference herein in its entirety.

Drain channel 5 is shown extending from one side of slab 18 to the other, however drain channel 5 may be constructed with only one discharge opening.

In a preferred embodiment, drain channel 5 includes a bottom side 19, opposing vertical sides 20, 21, horizontal flanges 22, 23, and vertical lips 27 (only one visible in FIG. 1). A valve 14 or valves 13, 14 may be located at the sides of drain channel 5 to allow discharged material to be removed from the enclosure.

Valve 14a is depicted in its closed position in FIG. 1. FIG. 1 also shows heater element 15 which may be employed to maintain the fluid conveying device and associated valves and piping above the freezing point of the material transferred within the pipeline. The heater may be placed in the slab or rest upon it to allow the concrete slab to act as a heat sink for thermal storage. The invention is particularly useful for pipelines carrying water, however its principles may be used for the protection of fluid conveying devices transferring any other material where either the material itself or the fluid conveying device surrounding the material is susceptible to solidification, such as a pressure regulator controlling the flow of natural gas.

FIGS. 2, 3, 3A and 4 show greater detail of the drain channel 5. The drain channel 5 is shown having two valves 13, 14 which may be rotated upon pivot pins 26. Drain channel 5 is supported by its horizontal flanges 22, 23 on concrete slab 18 but may also be supported upon other surfaces, such as the ground or a slab made of a material other than concrete. The valves of this invention provide improved results compared to those described in the above-incorporated U.S. patents because the valves are smaller and form better drain opening seals, thus heat losses are minimized. The operation of valves 13, 14 is discussed in more detail below with regard to FIGS. 5–9.

If ambient conditions are such that freezing may occur, then power may be delivered to the area enclosed by the cover 1 to maintain the temperature above a setpoint controlled by a controller, such as a thermostat. Power may be delivered via electrical current (alternating or direct), solar power, geothermal power, wind power, and the like. For example, heating element 15 may be disposed within the drain channel 5 and supported on heating element supports 24, 25. Any suitable heater having the capability of maintaining the fluid conveying device and the material therein at a temperature high enough to avoid freezing the material and the fluid conveying device may be used. A preferred heater, Formed Watrod, Catalogue #RGNA 132105, manufactured by Watlow, #6 Industrial Loop Road, Hannibal, Mo., has been found to be a useful device for maintaining the temperature within the cover 1. In a preferred embodiment, heating element 15 is connected to a power supply through a liquid tight conduit 17 at a water resistant junction box 16. Of course, the junction box may be disposed in locations within the cover 1 other than that depicted in FIG. 2 including outside of cover 1. Due to the excessive stratification of heat within a cover of the type described by the invention, a lower location of heater element 15 improves the maintenance of the temperature of the material and the devices conveying the material.

Figure 5A:
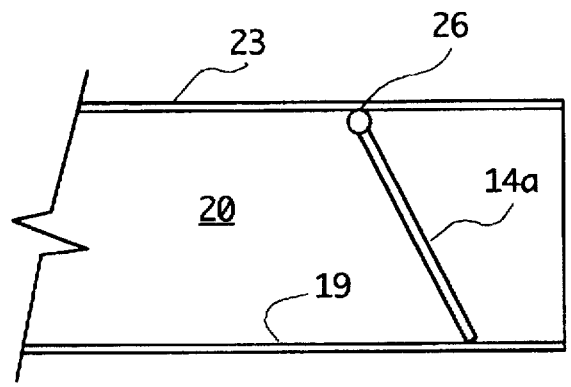
FIGS. 5A, 5B and 5C are end views showing the operation of one valve constructed according to the principles of the invention.
Figure 5B:
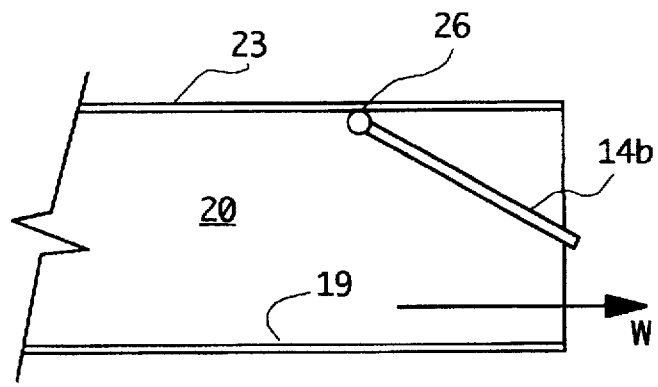
Figure 5C:
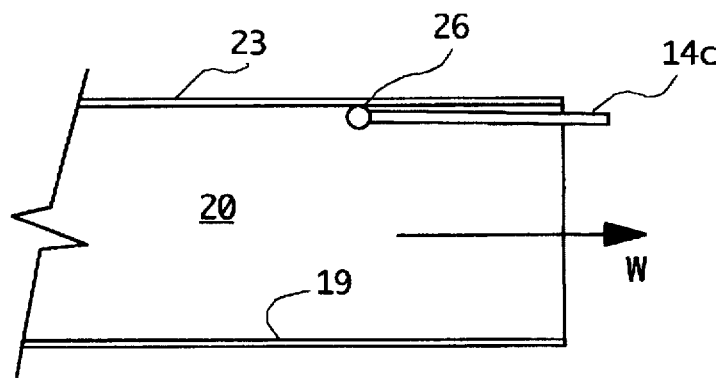

FIGS. 5A, 5B and 5C demonstrate the operation of one discharge valve constructed according to the principles of the invention. FIG. 5A shows valve flap 14a in a closed position and at the other extreme, FIG. 5C illustrates valve flap 14c in a fully open orientation. FIG. 5B is intermediate and depicts valve flap 14b in a partially open position. Valve flap 14 is shown as having a vertical measurement which exceeds the height of vertical side 20 so that valve flap 14 engages the bottom side 19 of drain channel 5. In one preferred embodiment, valve flap 14 consists of rigid material, such as metal or hard plastic, secured to a pivot pin or pins 26. When the backflow prevention device dumps a large volume of water, and even when it drips smaller quantities, valve flap 14 will rotate or pivot up and allow water stream W to be removed from the cover 1.

Valve flap 14 may also be constructed of flexible material. In fact, any material that flexes enough so that it forms an opening and is resilient and elastic enough to return to its original position and seal the discharge opening so that air transference is minimized is a material that may be successfully utilized as the material of construction for the valve flaps. Cured reinforced or nonreinforced EPDM (Terpolymer of Ethylene, Propylene, and Diene) compounded elastomer available as "Sure-Seal EPDM membrane" from Carlisle Tire & Rubber, Carlisle, Pa., is a preferred material due to its flexibility, strength and resiliency over a wide range of temperatures. In a preferred embodiment the material utilized for valve flaps may be produced from extruded sheet material having a thickness of approximately 0.06 inches. Depending on the strength and flexibility of the material of construction of valve 14, valve 14 will pivot away from the flow of water to varying degrees. Valve 14 returns to a closed position, illustrated by valve 14a, after the backflow prevention device completes discharging and the material is removed from the cover.

Figure 6:
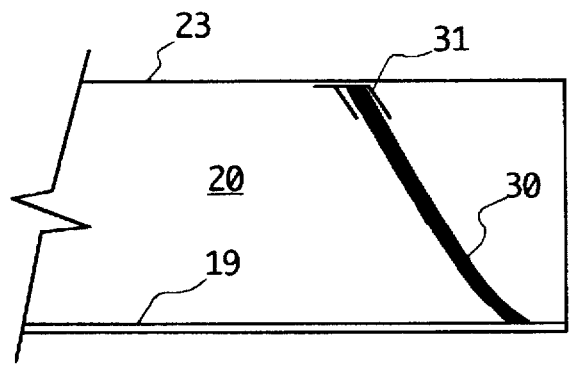
FIG. 6 is an end view of another valve constructed according to the principles of the invention.
Figure 7:
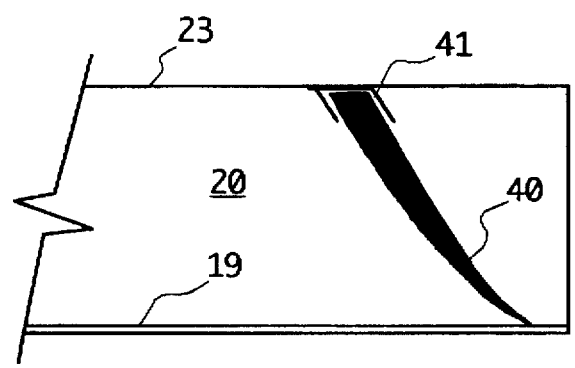
FIG. 7 is an end view of a further valve constructed according to the principles of the invention.

FIGS. 6 and 7 show other valves constructed according to the principles of the invention. FIG. 6 illustrates a double durometer, uniform thickness valve flap 30 that is attached to the drain channel 5 via flap carrier 31. This valve flap 30 combines a rigid material for strength with a flexible material for functionality in one common cross-section and is available from Carlisle Guauga, a division of Carlisle Tire & Rubber, 15332 Old State Road, Middlefield, Ohio. Thus valve flap 30 is manufactured such that it is flexible enough to allow discharged material to be removed efficiently from the enclosure but is resilient enough to close and seal the opening when no material need be transferred.

Variable thickness valve flap 40, shown in FIG. 7, is also available from Carlisle Guauga and is designed to meet these same operational requirements of flexibility, resilience, and sealing capability. The upper portion of valve flap 40 is fixed to flap carrier 41 and the lower portion of valve flap 40 moves upward when material is being discharged from the drain channel 5. Additionally, a weighted strip (not shown) may be fixed to the flaps of any of the valves of this invention to force the lower portion of the flaps to suitably seal the valve opening. Importantly, valves 14, 30 and 40 do not require springs and hinges and thus are substantially maintenance free.

Figure 8:
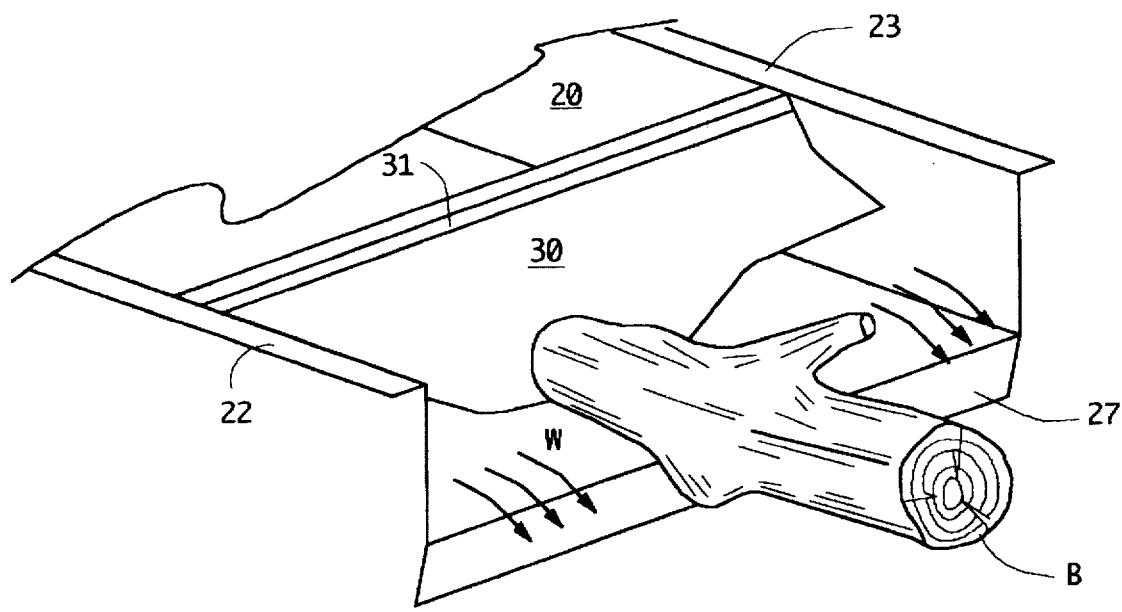
FIGS. 8 and 9 demonstrate the effectiveness of the valves constructed according to the principles of the invention when an object is obstructing the valve.
Figure 9:
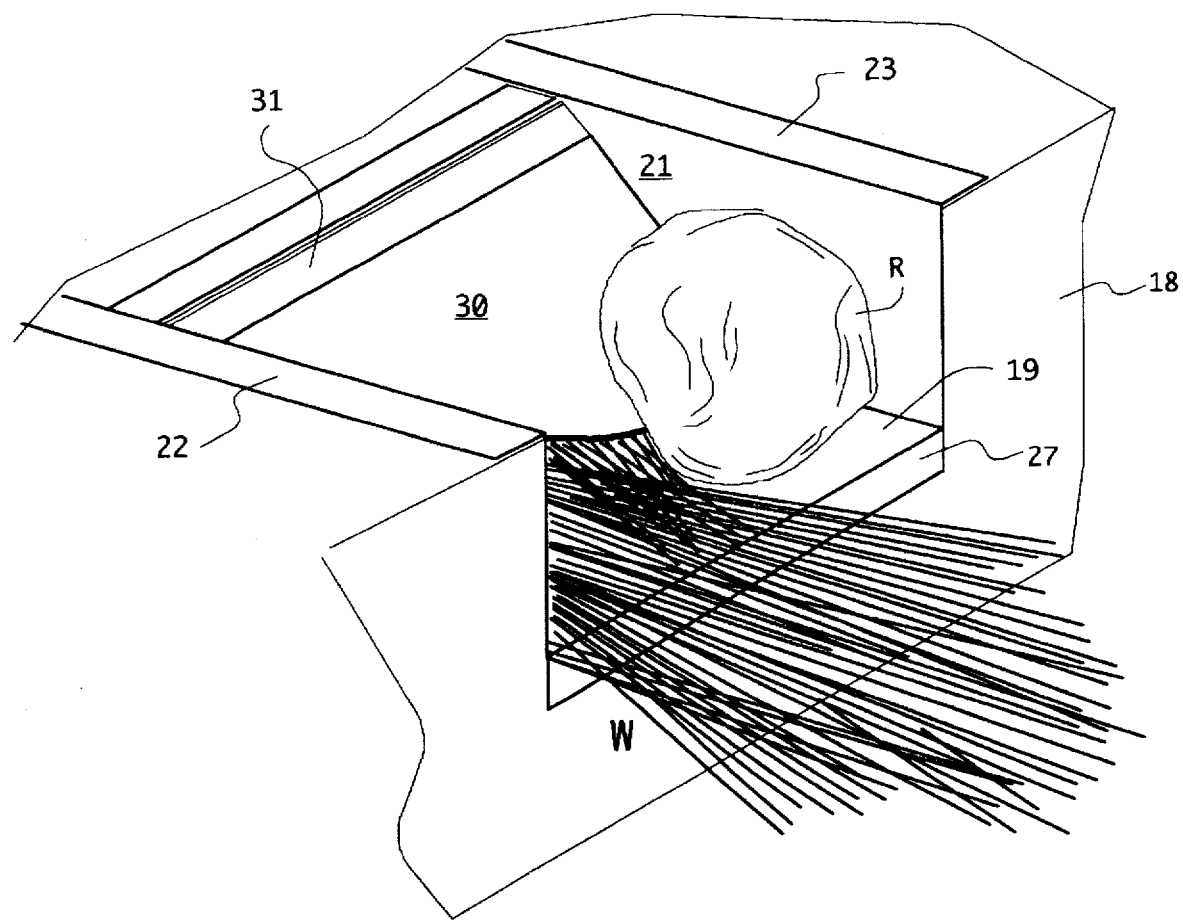

FIGS. 8 and 9 demonstrate the effectiveness of the valves constructed according to the principles of the invention when an object is in contact with the valve. FIG. 8 illustrates that although a branch B has fallen on flap 30 the water stream W continues to flow around the branch B. FIG. 9 also demonstrates the flexibility of the valves of the invention by showing that a water stream W will flow around another obstruction, such as a rock R, that is blocking the discharge opening of drain channel 5.

Figure 10:
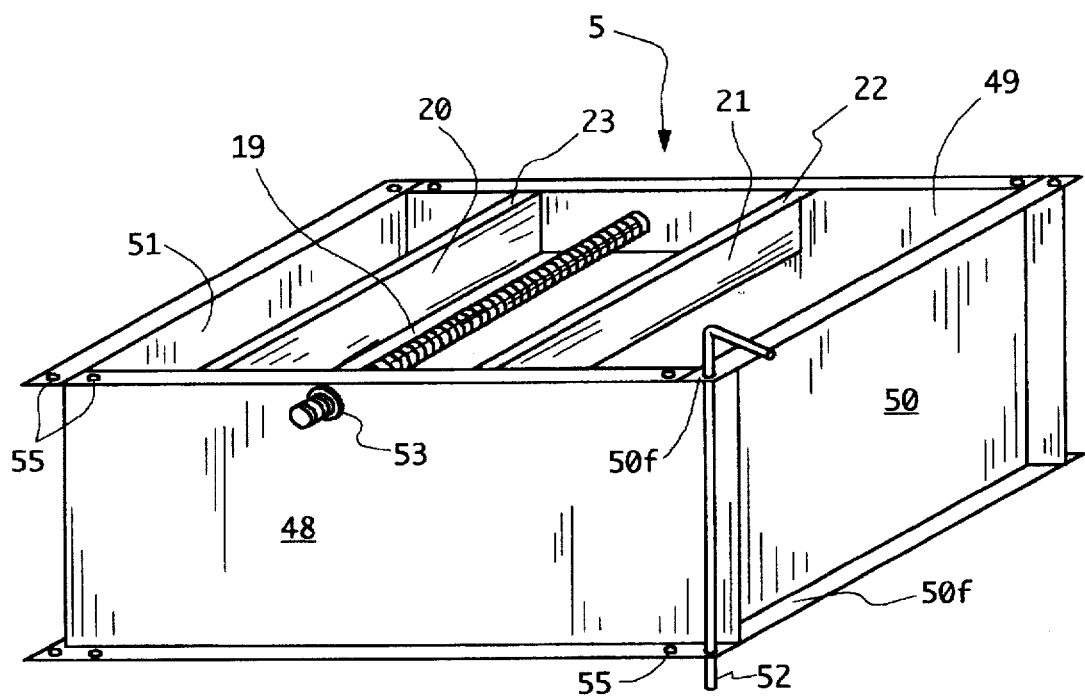
FIG. 10 is a perspective view of the drain channel surrounded by forms for making a concrete pad.
Figure 11:
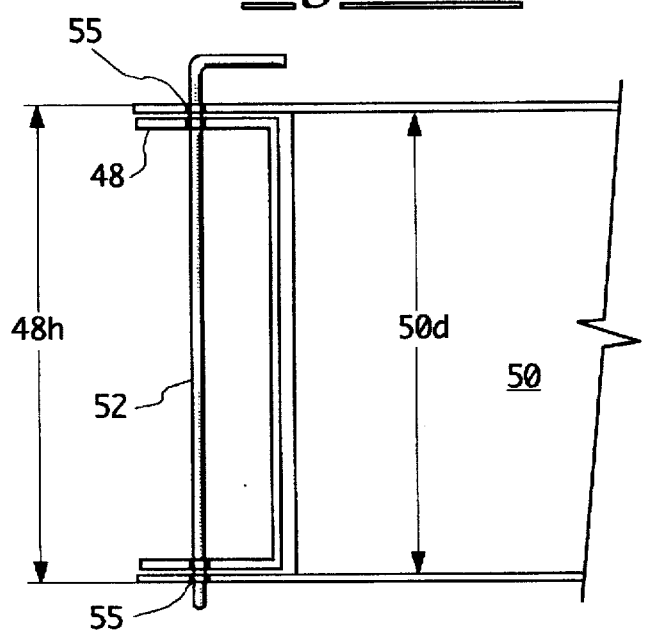
FIG. 11 is an end elevational view of the intersection between adjacent forms constructed according to the principles of the invention.

FIG. 10 is a perspective view of the drain channel surrounded by forms for making a concrete pad. The perimeter of the concrete slab 18 may be formed by utilizing side channel forms 48, 49 and end channel forms 50, 51. In a preferred embodiment side channel forms are fabricated so that side channel form height 48h is less than the distance 50d between the upper and lower end channel form flanges 50f. Thus, the length of concrete slab 18 may be varied by sliding the end channel forms 50, 51 along side channel forms 48, 49. Once the forms are suitably positioned, form erection pins 52 may be inserted through openings 55 and the drain channel 5 may be placed between side channel forms 48, 49. At this point a threaded rod 53 may be inserted and affixed between side channel forms 48, 49, to hold the drain channel 5 and forms 48–51 in place until the concrete is in place. Although side channel forms 48, 49 only show two openings 55 at their outer ends, these forms 48, 49 may be lengthened and a plurality of openings may be inserted to provide for a plurality of slab lengths. Of course, the principles described with respect to the adjustable nature of forms 48–51 may be utilized to allow for a variety of slab widths.

What is claimed is:

1. Apparatus for protecting a fluid conveying device in fluid communication with valves and piping upstream and downstream of the device that is used in connection with a slab having an upper surface, wherein the upstream and downstream piping extend through the slab, comprising:

a drain channel configured for support on the surface of the slab;

a valve disposed in the drain channel, said valve sealing the drain channel when closed and allowing the passage of fluid to the atmosphere when open; and a cover surrounding the fluid conveying device and the drain channel, said cover having a top wall and side walls wherein the side walls of the cover are adapted to be disposed upon the surface of the slab.

2. The apparatus of claim 1 further comprising a plurality of valves disposed in the drain channel.

3. The apparatus of claim 1 further comprising a heater, said heater being disposed in the cover.

4. The apparatus of claim 1 further comprising a heater, said heater being disposed in the drain channel.

5. The apparatus of claim 1 wherein the valve comprises a rigid material.

6. The apparatus of claim 1 wherein the valve comprises a flexible material.

7. The apparatus of claim 1 wherein the valve comprises double durometer material.

8. The apparatus of claim 1 wherein the valve comprises material having a variable thickness.

9. The apparatus of claim 1 further comprising a weighted object, said weighted object attached to said valve.

10. Apparatus for protecting a fluid conveying device in fluid communication with valves and piping upstream and downstream of the device, comprising:

a slab having an upper surface, said slab permitting the extension of the upstream and downstream piping therethrough;

a drain channel supported on the surface of the slab;

a valve disposed in the drain channel, said valve sealing the drain channel when closed and allowing the passage of fluid to the atmosphere when open; and a cover surrounding the fluid conveying device and the drain channel, said cover having a top wall and side walls wherein the side walls of the cover are adapted to be disposed upon the surface of the slab.

11. The apparatus of claim 10 wherein the slab is concrete.

12. Apparatus for protecting a fluid conveying device in fluid communication with valves and piping upstream and downstream of the device, comprising:

channel forms encircling the upstream and downstream piping, said channel forms having a top and bottom and defining the perimeter of a slab;

a drain channel supported on said channel forms and extending below the top of said channel forms;

a cover surrounding the fluid conveying device and the drain channel, wherein the cover is supported upon the upper surface of the slab.

13. The apparatus of claim 12 wherein the channel forms are constructed to provide a perimeter for a plurality of slab configurations.

14. Apparatus for protecting a fluid conveying device in fluid communication with valves and piping upstream and downstream of the device, wherein the upstream and downstream piping extends vertically upwardly through an upper surface of a slab, comprising:

a drain channel adapted for support on the slab;

an outlet disposed in the drain channel that allows fluid from the fluid conveying device to be transferred to the atmosphere; and a cover surrounding the fluid conveying device and the drain channel, said cover having a top wall and side walls wherein the side walls of said cover are configured to be disposed upon the upper surface of the slab.

15. The apparatus of claim 14 further comprising a heater, said heater being disposed in the cover.

16. The apparatus of claim 14 further comprising a heater, said heater being disposed in the drain channel.

17. The apparatus of claim 14 further comprising a valve disposed in the outlet of the drain channel, wherein the valve comprises a rigid material.

18. The apparatus of claim 14 further comprising a valve disposed in the outlet of the drain channel, wherein the valve comprises a flexible material.

19. The apparatus of claim 14 further comprising a valve disposed in the outlet of the drain channel, wherein the valve comprises double durometer material.

20. The apparatus of claim 14 further comprising a valve disposed in the outlet of the drain channel, wherein the valve comprises material having a variable thickness.

21. The apparatus of claim 14 further comprising a valve disposed in the outlet of the drain channel and a weighted object, said weighted object attached to said valve.

22. Apparatus for protecting a fluid conveying device in fluid communication with valves and piping upstream and downstream of the device, comprising:

a slab having an upper surface, wherein the upstream and downstream piping extends vertically upwardly through an upper surface of the slab, a drain channel adapted for support on the slab;

an outlet disposed in the drain channel that allows fluid from the fluid conveying device to be transferred to the atmosphere; and a cover surrounding the fluid conveying device and the drain channel, said cover having a top wall and side walls wherein the side walls of said cover are configured to be disposed upon the upper surface of the slab.

* * * * *